US008904056B2

(12) United States Patent
Robert et al.

(10) Patent No.: US 8,904,056 B2
(45) Date of Patent: Dec. 2, 2014

(54) MULTI-HOST WIRELESS INPUT DEVICE

(71) Applicant: Logitech Europe S.A., Morges (CH)

(72) Inventors: Jacques Robert, Le Mont-sur-Lausanne (CH); Sylvain Sauvage, La-Tour-de-Peliz (CH); Olivier Bodenmann, Echallens (CH); Jean-Christophe Hemes, Grandson (CH); Guy Raeber, Chardonne (CH); Mathieu Meisser, La Conversion (CH); Olivier Theytaz, Savigny (CH); Regis Croisonnier, Saint-Martin-Bellevue (FR)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 13/841,508

(22) Filed: Mar. 15, 2013

(65) Prior Publication Data

US 2013/0282932 A1    Oct. 24, 2013

Related U.S. Application Data

(60) Provisional application No. 61/636,434, filed on Apr. 20, 2012.

(51) Int. Cl.
| | |
|---|---|
| *G06F 3/06* | (2006.01) |
| *G06F 3/023* | (2006.01) |
| *G06F 11/30* | (2006.01) |
| *G06F 3/02* | (2006.01) |
| *G06F 13/00* | (2006.01) |

(52) U.S. Cl.
CPC .......... *G06F 11/3051* (2013.01); *G06F 3/0231* (2013.01); *G06F 13/00* (2013.01); *G06F 3/0219* (2013.01)
USPC ............ 710/17; 710/2; 710/5; 710/8; 710/11; 710/14

(58) Field of Classification Search
None
See application file for complete search history.

(56) References Cited

U.S. PATENT DOCUMENTS

| | | |
|---|---|---|
| 7,162,232 B2 | 1/2007 | Ramakesavan et al. |
| 2010/0225589 A1 | 9/2010 | Hsieh |
| 2011/0143671 A1 | 6/2011 | Hsieh |
| 2011/0217932 A1 | 9/2011 | Hsieh |
| 2013/0089026 A1* | 4/2013 | Piper et al. .................. 370/328 |

* cited by examiner

*Primary Examiner* — Scott Sun
(74) *Attorney, Agent, or Firm* — Kilpatrick Townsend & Stockton LLP (57) ABSTRACT

Embodiments of the invention are directed to input devices configured for use with computing devices. The present invention relates to methods and devices for establishing, maintaining and managing, wireless connections with between an input device and one or more host devices that the input device is paired with. The input device may include sensory feedback indicating the host device actively paired with the input device, and may enable switching between host devices.

9 Claims, 7 Drawing Sheets

MULTI-HOST WIRELESS INPUT DEVICE

CROSS-REFERENCE TO RELATED APPLICATION

This application is a non-provisional application of and claims the benefit of priority of U.S. Provisional Application No. 61/636,434, titled, "Multi-Host Wireless Keyboard," filed on Apr. 20, 2012, which is herein incorporated by reference in its entirety for all purposes.

BACKGROUND OF THE INVENTION

Today, it is common for users to have a multitude of computing devices that they use on a regular basis, and even simultaneously. For example, users may have PC desktops, laptops, smart phones, and tablet computers. Despite the burgeoning use of touchscreen technology in computing devices, many users still prefer to use a physical keyboard for data entry into their computing devices. For some, virtual keyboards that are provided on many computing devices can be inconvenient or difficult to use. For example, the virtual keyboard on a smart phone may be too small for entering significant amounts of text via the virtual keyboard. Similarly, some users may prefer to use other types of input devices, such as a wireless mouse or touchpad, to interact with and navigate the display screen of computing devices.

In addition, users often interface with more than one of these computing devices at a time. For example, a user may be using a laptop computer for business purposes and a tablet computer for entertainment purposes. It would be cumbersome to carry a separate keyboard for each computing device and physically move from one keyboard connected to one computing device to second keyboard connected to a second computing device in order to enter data into multiple computing devices. Some alternatives allow reusing a single keyboard for data entry to multiple computing devices. However, these solutions are not without their drawbacks.

Wired keyboards that physically connect to computing devices may require unplugging the keyboard from one computing device and plugging the keyboard into another computing device to reuse the keyboard across multiple computing devices. Each time the user wants to change the computing device that the user wants to send data to, the wire must be unplugged from a first computing device and then plugged into a second computing device. Plugging multiple computing devices into a switchbox for directing keyboard input into the desired computing device may require carrying a switchbox along with the keyboard and multiple cables, and may require connecting mobile devices to the switchbox before using the keyboard.

Wireless keyboards may be used to connect to a computing device without having to plug in physical cables. This can be especially useful for a user using a smart phone or a tablet device that prefers to use a physical keyboard for text entry because the virtual keyboards offered natively with such devices may be inconvenient to use.

Like wired keyboards, while wireless keyboards may be convenient for pairing with and connecting to one computing device at a time, switching connections between multiple computing devices can present their own share of difficulties. For example, each time the user may want the connection switched between computing devices, the discovery and pairing process has to be performed. If the user often switches between computing devices, this can become a cumbersome experience.

Based on the foregoing, there is a need in the art for improved methods and systems to establish pairings between an input device and computing (or host) devices.

SUMMARY OF THE INVENTION

The present invention relates generally to control devices, such as human interface devices, configured for use with electronics or computing devices. More specifically, the present invention relates to methods and systems for pairing multiple host devices with a single input device (e.g., keyboard, mouse, or touchpad devices) and switching between the paired host devices.

Embodiment of the present invention may provide a data input device comprising, a housing, a communications module, coupled to the housing, operable to discover a plurality of computing devices capable of establishing a connection over a wireless connection, and further operable to maintain an established connection with the plurality of computing devices. The data input device may also comprise a plurality of input members disposed on the housing, the plurality of input members including a plurality of host connection keys configured to cause the communications module to discover the plurality of computing devices accessible over the wireless connection, and a light-emitting member associated with each host connection key of the plurality of host connection keys.

Embodiment of the present invention may further provide a method for establishing wireless connections with a data input device, comprising, enabling the data input device to be discoverable through a data communications connection, activating light-emitting members associated with a plurality of input members at a first blink rate, by a light controller, establishing, by a communications module, the data communications connection between the data input device and a host device. The method further comprises assigning, by the communications module, a pairing between the data input device and the host device with a selected input member of the plurality of input members, and modifying a light-emitting member associated with the selected input member to a second blink rate.

Embodiment of the present invention may further provide a non-transitory computer-readable storage medium comprising a plurality of computer-readable instructions tangibly embodied on the computer-readable storage medium, which, when executed by a data processor, provides a method for establishing wireless connections with a data input device, the plurality of instructions comprising, enabling the data input device to be discoverable through a data communications connection, activating light-emitting members associated with a plurality of input members at a first blink rate, by a light controller, establishing, by a communications module, the data communications connection between the data input device and a host device. The method further comprises assigning, by the communications module, a pairing between the data input device and the host device with a selected input member of the plurality of input members, and modifying a light-emitting member associated with the selected input member to a second blink rate.

Numerous benefits are achieved by way of the present invention over other techniques. For example, some embodiments of the present invention provide the ability to establish and maintain multiple simultaneous pairings between an input device and a plurality of host devices without requiring re-pairing operations to be conducted in order to switch between host devices. Another benefit is the reduction in power consumption required to conduct any re-pairing process as once a host device is paired to the input device, the connection is stored and the re-pairing process is not required.

These and other embodiments of the invention along with many of its advantages and features are described in more detail in conjunction with the text below and attached figures.

DETAILED DESCRIPTION OF SPECIFIC EMBODIMENTS

Embodiments of the invention are generally directed to systems and methods for operating a multi-host wireless input device. Embodiments are described with respect to a multi-host wireless input device in the form of a computer keyboard device. However, embodiments of the invention are not limited to input devices in the form of computer keyboard devices. Other embodiments contemplate input devices in other forms, including, but not limited to, multi-host wireless mice and touchpad input devices.

Figure 1:
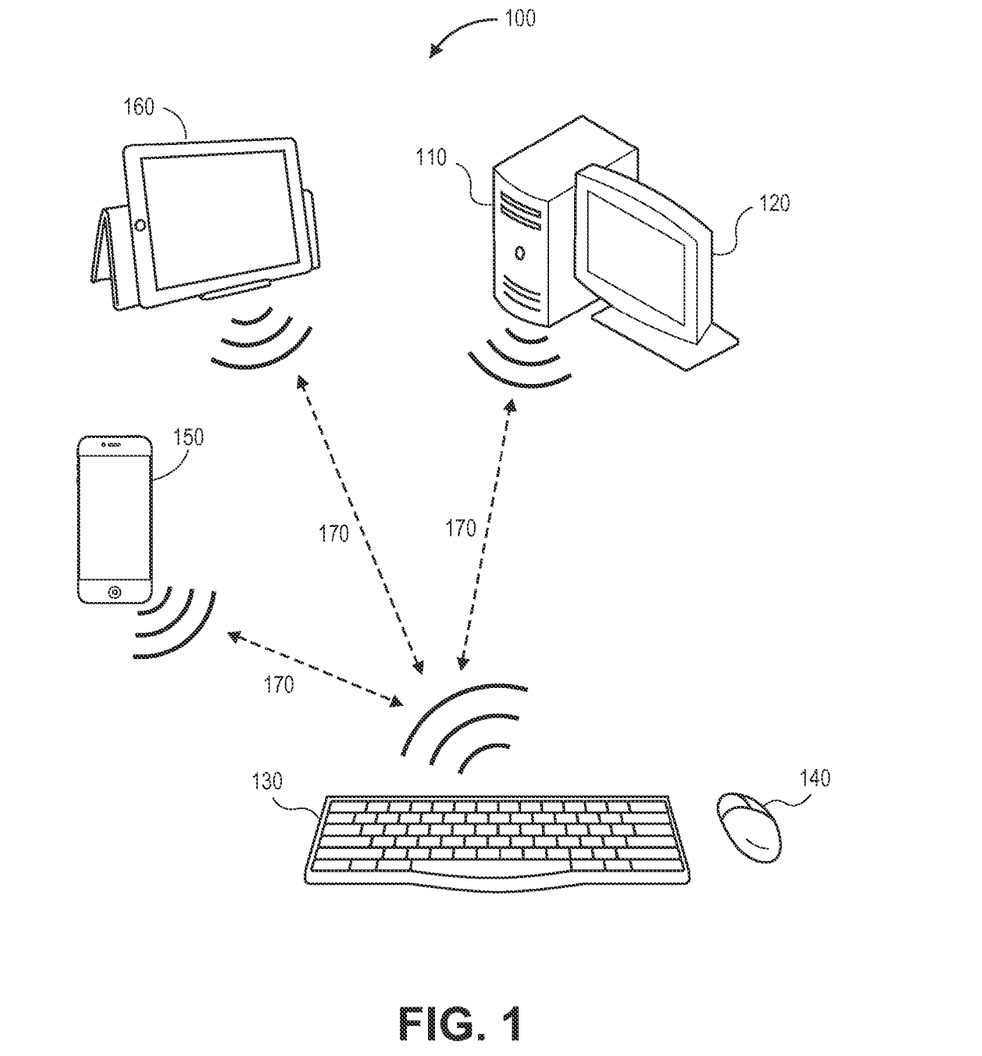
FIG. 1 is a simplified schematic diagram of a computer system according to an embodiment of the present invention.

FIG. 1 is a simplified schematic diagram of a computer system 100 according to an embodiment of the present invention. Computer system 100 includes a computer 110, a monitor 120, a keyboard 130, and a control device 140. In one embodiment, the control device 140 is a multi-modal mouse control device. In some embodiments, the control device 140 may refer to either or both the keyboard 130 and a mouse control device. For computer system 100, the keyboard 130 and control device 140 are configured to control various aspects of computer 110 and monitor 120. Computer 110 may include a machine-readable medium (not shown) that is configured to store computer code, such as keyboard driver software, control device driver software, and the like, where the computer code is executable by a processor (not shown) of the computer 110 to affect control of the computer 110 by the control device 140 and keyboard 130. In some embodiments, the keyboard 130 can be hardwired, wirelessly coupled, or integrated into a computer 110.

In addition to providing data input to a computer system 100, keyboard 130 can be utilized in any number of configurations and systems (e.g., personal computers, servers, terminals, etc.) as would be appreciated by one of ordinary skill in the art. For example, the keyboard 130 may wirelessly connect to and provide input to smart phone 150 and/or tablet computer 160. FIG. 1 illustrates keyboard 130 with simultaneous pairings to smart phone 150, tablet 160, and computer 110 over a wireless connection 170. In some embodiments, the wireless connection 170 can use a Bluetooth™ connection for short-range contact or communications capabilities. Bluetooth™ is a wireless technology standard for exchanging data over short distances from fixed and mobile devices. Some embodiments can include other means for providing short-range contact or contactless communications capability, such as RFID, infra-red, or other data transfer capability that can be used to exchange data between the keyboard 130 and the host device. In other embodiments, communications between the keyboard 130 and the host device is conducted using a communications protocol. For example, the communications protocol may be operating at 2.4 GHz or 5.8 GHz.

Figure 2:
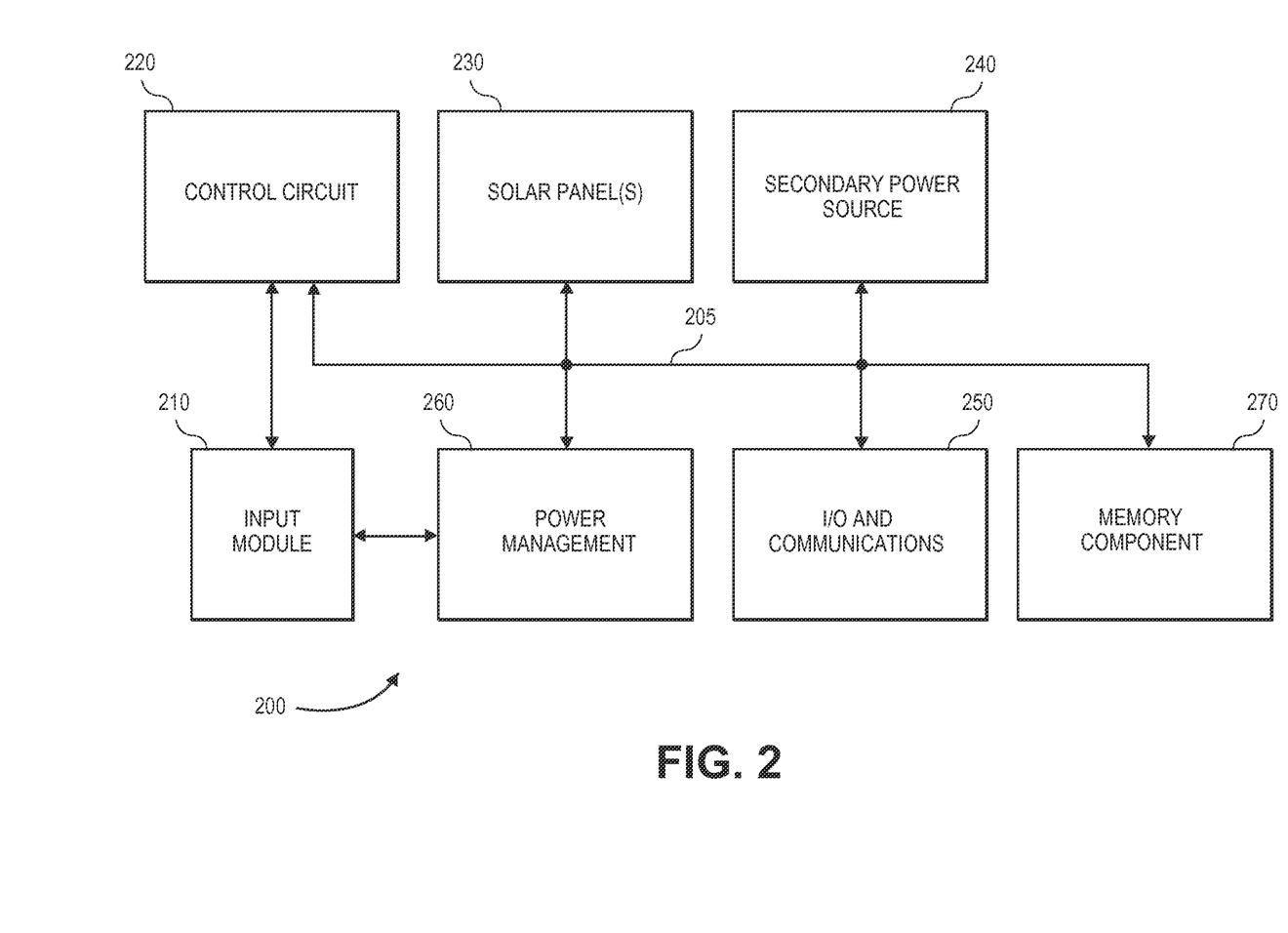
FIG. 2 is a simplified block diagram of an input device according to an embodiment of the present invention.

FIG. 2 is a simplified block diagram of an input device 200 according to an embodiment of the present invention. The input device 200 may be in the form of a keyboard system 200. In other embodiments, the input device 200 may be a mouse device or touchpad device. The keyboard system 200 includes a bus 205, an input module 210, a control circuit 220, a solar panel 230, a secondary power source 240, an input/output (I/O) and communications system 250, a power management system 260, and a memory component 270. The control circuit 220, solar panel 230, secondary power source 240, input/output (I/O) and communications system 250, power management system 260, and memory component 270, are in electronic communication with one another via the bus 205. The input module 210 is independently connected to the control circuit 220 and power management block 260. In some embodiments, the input module 210 may be connected to the other modules via the bus 205. It should be noted that many other bus 205 configurations can be used that can include or exclude any of the various system elements of keyboard system 200 as would be known by one of ordinary skill in the art.

In some embodiments, the input module 210 can include a plurality of keystroke input elements or devices. In such embodiments, the input module 210 is operable to receive input in response to a user pressing an alphanumeric key (e.g., QWERTY keys, function keys, numeral or number pad keys, etc.), or other suitable input element or device such as a media control button, voice-over-internet-protocol (VoIP) button, touch sensors (e.g., touch pads) and the like. The input module 210 is capable of generating character data associated with the pressed keystroke input elements and sending the character data to the control circuit 220.

In some embodiments, the control circuit 220 comprises one or more microprocessors (μCs), and the control circuit 220 is configured to control the operation of keyboard system 200. Alternatively, the control circuit 220 may include one or more microcontrollers (MCUs), digital signal processors (DSPs), field programmable gate arrays (FGPA), programmable logic devices (PLDs), or the like, with supporting hardware/firmware (e.g., memory, programmable I/Os, etc.), as would be appreciated by one of ordinary skill in the art with the benefit of this disclosure. Alternatively, MCUs, μfs, DSPs, and the like, may be configured in other system blocks of system 100, outside of keyboard system 200. For example, a microprocessor in computer 110 can be configured to process keyboard input commands from the input module 210 via a wireless or hardwired connection.

Figure 3A:
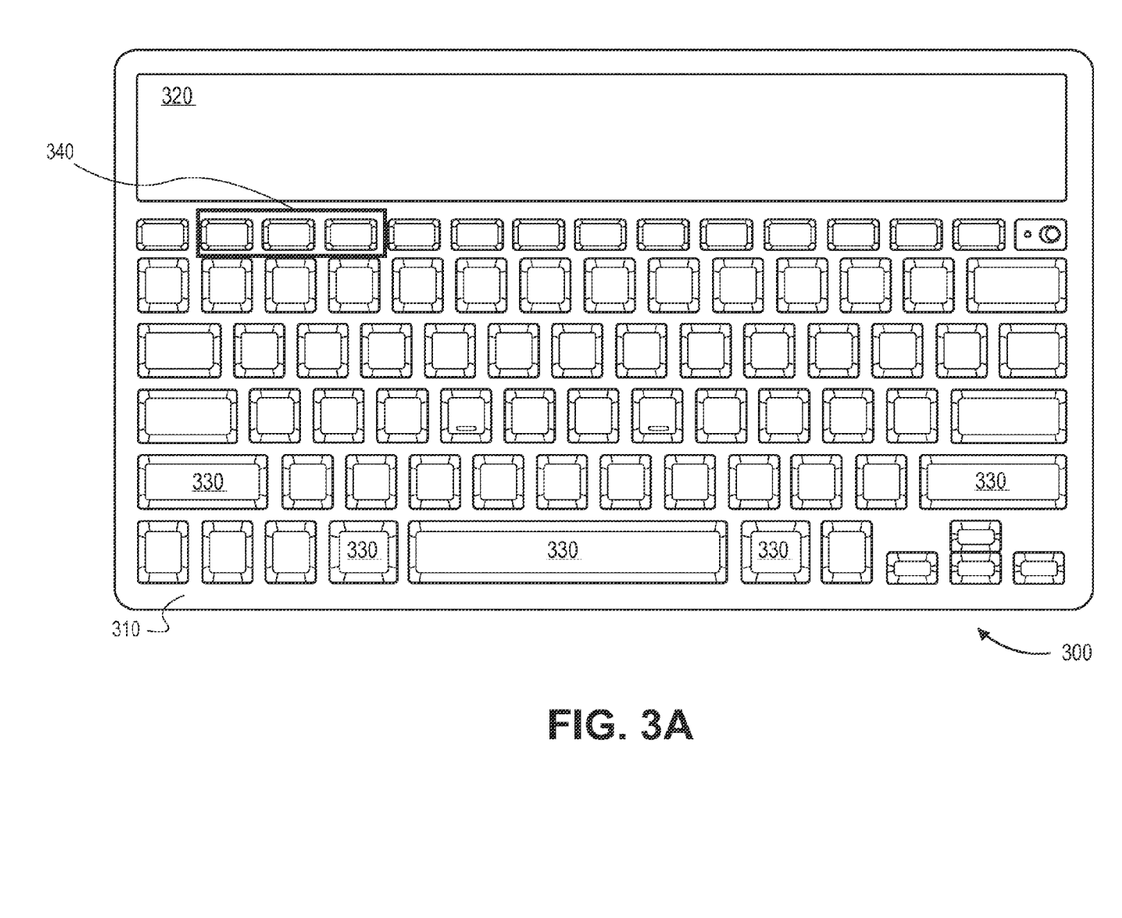
FIG. 3A is a top view of a computer keyboard device according to an embodiment of the present invention.

The solar panels 230 are configured to convert light energy into electrical energy for powering electronic keyboard 130. In some embodiments, the solar panels 230 are configured to provide power to the control circuit 220, the power management block 260, the I/O and communications block 250, and the secondary power source block 240. The solar panels 230 can be disposed on any suitable place on the keyboard that provides enough surface area to accommodate them. In one embodiment, the solar panels 230 are disposed on the top portion of the top surface of keyboard 130, as depicted in FIG. 3A.

The solar panels 230 are an optional feature of the input device 200. In some embodiments of the invention, solar panels 230 are not present and the input device 200 is powered by the secondary power source 240.

The secondary power source 240 is configured to provide additional or backup power to the keyboard system 200. In some embodiments, the secondary power source 240 can include one or more rechargeable batteries including, but not limited to, the following types: lead-acid, alkaline, nickel cadmium (NiCd), nickel metal hydride (NiMH), lithium ion (Li-ion), lithium ion polymer (Li-ion polymer), or other rechargeable battery type known by those of ordinary skill in the art. In certain embodiments, the one or more rechargeable batteries can include AA type, AAA type, button cells (e.g., commonly found in watch batteries, hearing aid batteries, etc.), or other similarly sized battery types.

In some embodiments, the solar panels 230 provide power directly to the keyboard system 200 when in use, and some or all of the surplus power can be used to recharge the secondary power source 240. In alternative embodiments, the solar panels 230 provide power, through the power management block 260, to the keyboard system 200. In alternative embodiments, all the power from the solar panels 230 is directed to charging the secondary power source 240. In such embodiments, the secondary power source 240 is used to power the keyboard system 200.

Figure 4:
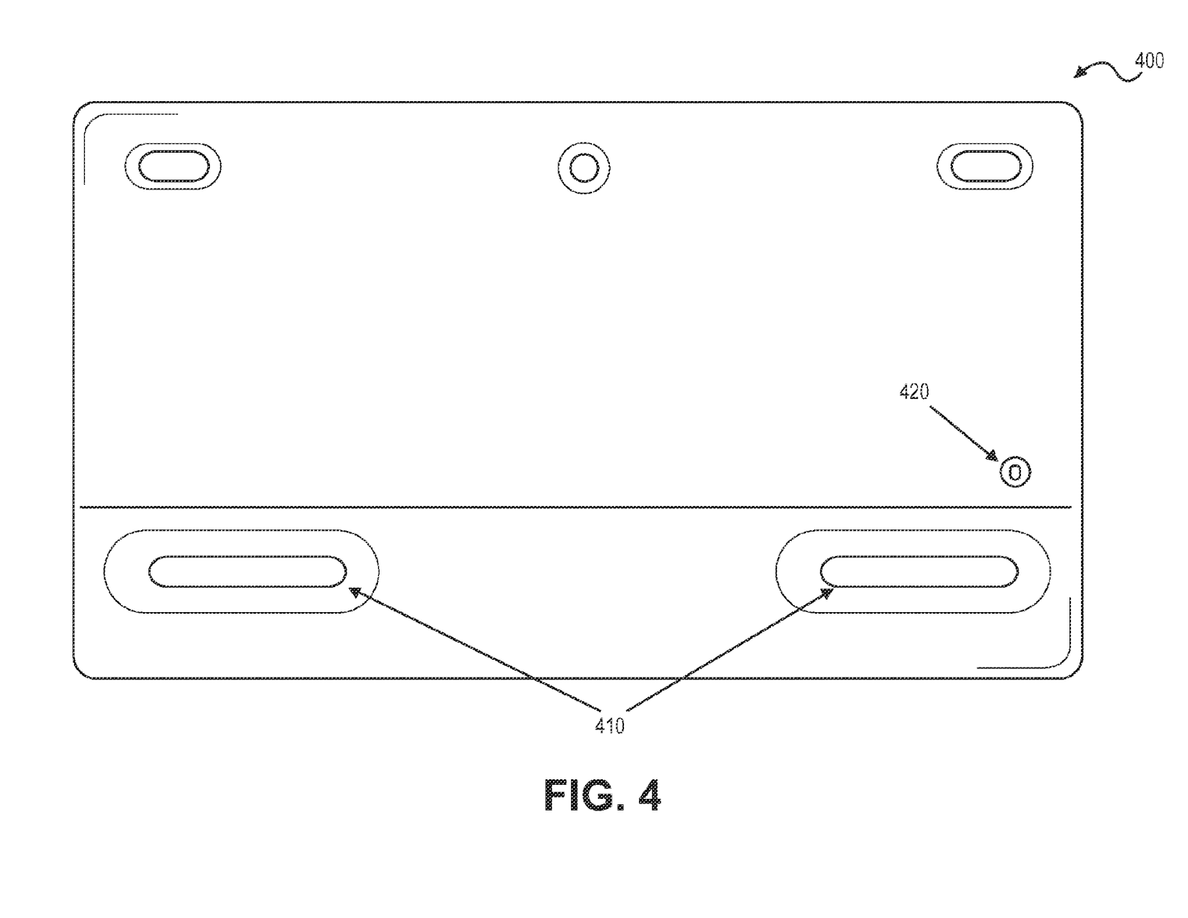
FIG. 4 is a bottom view diagram of the back of a computer keyboard device according to an embodiment of the present invention.

In some embodiments, the secondary power source 240 is disposed in a set of support structures in the keyboard frame. One embodiment of the support structures 410 in the keyboard frame is depicted in FIG. 4. In such embodiments, the support structures 410 may provide support, elevating the keyboard 130 above the surface the keyboard 130 is placed on. The shape of the support structures 410 can be dependent on the size of the battery. For example, keyboard systems 200 that utilize AAA batteries (e.g., cylindrically shaped) may have support structures 410 that are similarly shaped. In this particular example, the support structures 410 are substantially long and narrow to accommodate the individual AAA type batteries.

The I/O and communications block 250 is configured to provide input/output capabilities to the keyboard system 200. For example, the I/O and communications block 250 can route data from the input module 210 to the computer system 100 via a hardwire link or wireless connection. The I/O and communications block 250 can route alphanumeric key data, number pad key data, media control data, VoIP data, touch sensor data, and the like, to the computer 110 for further processing. The wireless connection can be Bluetooth™ or any other wireless standard or proprietary wireless network protocol. In some embodiments, the communications block 250 can maintain a wireless connection with multiple hosts such as host devices 110, 150, and 160 of FIG. 1, either with one host device a time or with multiple host devices at the same time. In the latter case, even if the connection is maintained with multiple host devices at the same time, the input data may only sent to one host device at a time (i.e., the host device currently selected).

The power management block 260 is configured to manage the electrical power supplied by the solar panel 230 and secondary power source 240. In some embodiments, the power management block 260 can route power directly from the solar panels 230 to the keyboard system 200. Alternatively, the power management block 260 can route power directly from the secondary power source (e.g., batteries) to the keyboard system 200 and route the captured solar energy from solar panels 230 to recharge the secondary power source. In some embodiments, the secondary power source 240 is configured to provide electrical power to the keyboard system 200 when the electrical power provided by the solar panel 230 falls below a predefined value (e.g., minimum power output). The power management block 260 can further distribute power from the solar panels 230 and secondary power source 240 to the other system components (e.g., control circuit 220, I/O and communications block 250 and the input module 210, or any combination thereof).

In some embodiments, the keyboard system 200 is only charged through the solar panels 230, lacking any other source of charging the battery or providing power to the keyboard system 200. For example, the keyboard system 200 may lack an electrical adapter for receiving power from a wall socket, a USB power source, or other AC or DC power source. In an alternative embodiment, the keyboard system 200 can utilize other energy sources in addition to the solar panels 230, for example, a USB power source, an AC or DC power source, or the like and/or may receive electrical power from a plurality of sources.

The memory component 270 is configured to store pairing data. In some embodiments, the memory component 270 is a non-volatile memory. In some embodiments, the memory component 270 can store the data for each of the pairings between the computer keyboard device 300 and the host devices. The pairing data may be stored in the memory component 270 even when the computer keyboard device 300 is powered down, such that when the computer keyboard device 300 is reactivated, the previously stored pairing data may be accessed.

FIG. 3A is a top view of a computer keyboard device 300 according to an embodiment of the present invention. The computer keyboard device 300 includes a keyboard housing 310 (which can also be referred to as a housing or a keyboard housing), a solar panel 320, and a plurality of input members 330.

The plurality of input members 330, which can also be referred to as input keys, can be disposed on the surface of the keyboard housing 310. The plurality of input members 330 (i.e., input keys) can include alphanumeric keys, VoIP control keys, media control keys, function keys, number pad keys, and the like. The layout of the input keys shown in FIG. 3A is merely for illustration. In some embodiments, the layout of the input keys may be different or the same as the layout shown in FIG. 3A.

The solar panel 320 can be a single solar panel, or multiple solar panels disposed on a surface of the keyboard frame 310. In some embodiments, the solar panel is disposed across a top portion of the top face of the computer keyboard device 300. In alternative embodiments, the solar panel 320 can be disposed on other portions of the computer keyboard device 300, including the front, back, sides, etc.

The computer keyboard device 300 supports wireless communication (e.g., Bluetooth™, infrared (IR), radio frequency (RF), and the like). Some embodiments may have one or more hardwired connections for data transfer (e.g., USB, FireWire, etc.) and/or external power sources (e.g., USB, AC adapter, etc.). Computer keyboard device 300 may further include a secondary power source (e.g., one or more batteries—not shown) to supplement the power provided by the solar panels 320.

In some embodiments, the host connection keys 340 are used to manage wireless connections between the computer keyboard device 300 and the host devices. Each of the host connection keys 340 is capable of representing one pairing of the computer keyboard device 300 with a remote host device. In some embodiments, the computer keyboard device 300 has three host connection keys 340, and the computer keyboard device 300 may store such pairings with three hosts simultaneously. Other embodiments may include greater than or fewer than three host connection keys 340. In some embodiments, the user can customize the number of host devices the user wants to store in the memory component 270.

Embodiments of the invention are not limited to host connection keys 340 being used to manage the multiple pairings. In some embodiments, managing the multiple pairings may be controlled by a selector switch disposed on the computer keyboard device 300, or other input device. In such embodiments, the selector switch may be movable between two or more positions, with each position of the selector switch indicating and representing a pairing with a different host device.

In other embodiments, managing the multiple pairings may be conducted using a capactive region. In such embodiments, the capacitive region may be activated by the detected presence of the user in proximity to the capacitive region, or by the physical touch of the user's finger on the capacitive region. Specific portions of the capacitive region may be designated for different pairings. In such embodiments, rather than depressing a physical key, the user can place their finger close to or on a region to indicate to the computer keyboard device 300 that the user wants to actively pair with the host device associated with the region.

The host connection keys 340, or alternatively, the selector switch or capactive region, may be disposed on any part of the surface of the computer keyboard device 300, or other input devices (e.g., mouse or touchpad device), to allow the user to access and manage the pairings between the computer keyboard device 300 and the multiple host devices.

Figure 3B:
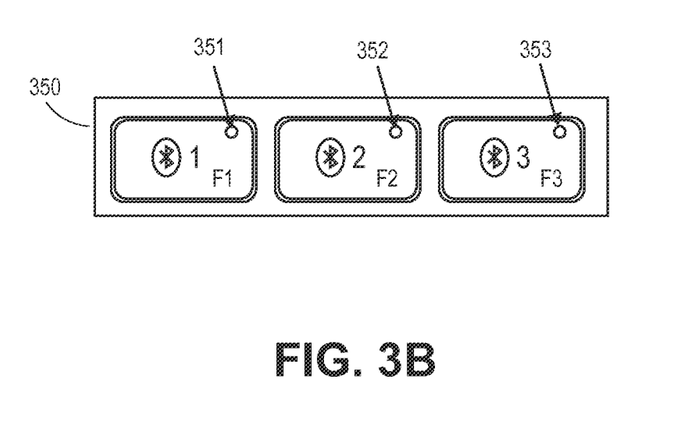
FIGS. 3B and 3C are exemplary components of a computer keyboard device according to embodiments of the present invention.
Figure 3C:
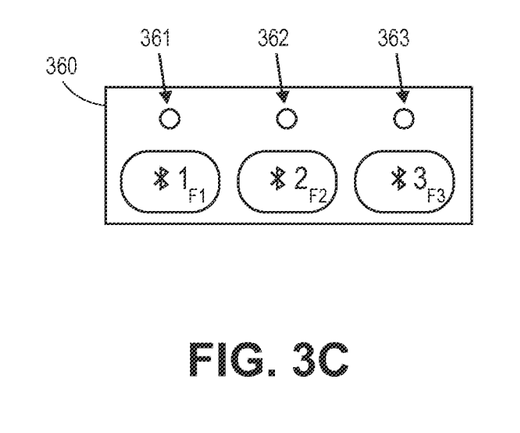

In some embodiments, a source of sensory feedback is associated with each of the host connection keys 340. In some embodiments, a light source such as a light emitting diode (LED) may provide sensory feedback to the user. In some embodiments, light source may be embedded in each of the host connection keys, as illustrated by light 351, 352, and 353 in illustration 350 in FIG. 3B. In an alternative embodiment, the light source may be embedded in the frame of the computer keyboard device 300 near the associated host connection keys as illustrated by lights 361, 362, and 363 in illustration 360 in FIG. 3C. The color of the LED can be blue or any other color. In some embodiments, each host connection key 340 may be associated with a different color LED. In other embodiments, the sensory feedback is in the form of an auditory or tactile feedback (i.e., a different sound or vibration may be emitted for each of the host connection keys 340 to indicate which is active).

In other embodiments, the source of sensory feedback may be in the form of a display embedded in the computer keyboard device 300. The display may be disposed in a separate portion of the computer keyboard device 300 from the host connection keys 340, with separate sections of the display associated with each of the host connection keys 340. In alternative embodiments, the display may be embedded in the host connection keys 340. The display may be an active (OLED or LCD) display or an electronic paper (black/white) passive display.

In some embodiments using an active display, the display may be hidden under the frame of the computer keyboard device 300 and be visible only when lit. The display may be active while the computer keyboard device 300 is in discovery mode. The display may indicate to which host device the computer keyboard device 300 is currently connected. The indicator may be an icon representing the type of host device connected (i.e., a symbol of a tablet or desktop computer) or a textual indication (i.e., "iPad™"). The display may also indicate the status of Bluetooth connections (or other communication protocols). For example, the Bluetooth connection status could display one of the following messages: "Connecting", "Connected", "Connection Failed", or "Switching Host Devices."

The active display and the indicator may be active for a predefined period of time (i.e., a timeout period), in order to lower energy consumption. When the computer keyboard device 300 is switched on, the active display may display the current host devices paired with each host connection key 340, with an additional indication of which host device is currently active.

In other embodiments using a passive electronic paper display, the display may be always active but updated/refreshed only during the discovery mode. As described above, the display may indicate to which host device the computer keyboard device 300 is currently connected. The indicators may be as described above with respect to embodiments with an active display. In some embodiments, when the passive electronic paper display is not displaying pairing information, as described above, the display can be used to provide other information, including current time and/or current temperature.

In some embodiments, the display is activated when any of the host connection keys 340 are pressed, when the keyboard is powered on, or when the computer keyboard device 300 is coming out of a low power mode caused by user inactivity.

FIG. 4 is a bottom view diagram of the back of a computer keyboard device 300 according to an embodiment of the present invention. The Bluetooth™ connector button 420, referred to herein as the "CONNECT" button 420, may be depressed to make the keyboard discoverable to scanning Bluetooth™ devices. It may be appreciated that other wireless protocols besides Bluetooth™ may also be used.

In addition to the sensory feedback of the host connection keys 340 (i.e., the LED), there may also be an additional indication of the type and name of the host device that is assigned or paired to each of the host connection keys 340. For example, the type and name of the host device could be recovered automatically by the means of the connection protocol, or could be entered (and manually configured/modified) by the user with the input means provided by the computer keyboard device 300. In other embodiments, the user can customize the name of the host device by inputting the name via the computer keyboard device 300.

Figure 5:
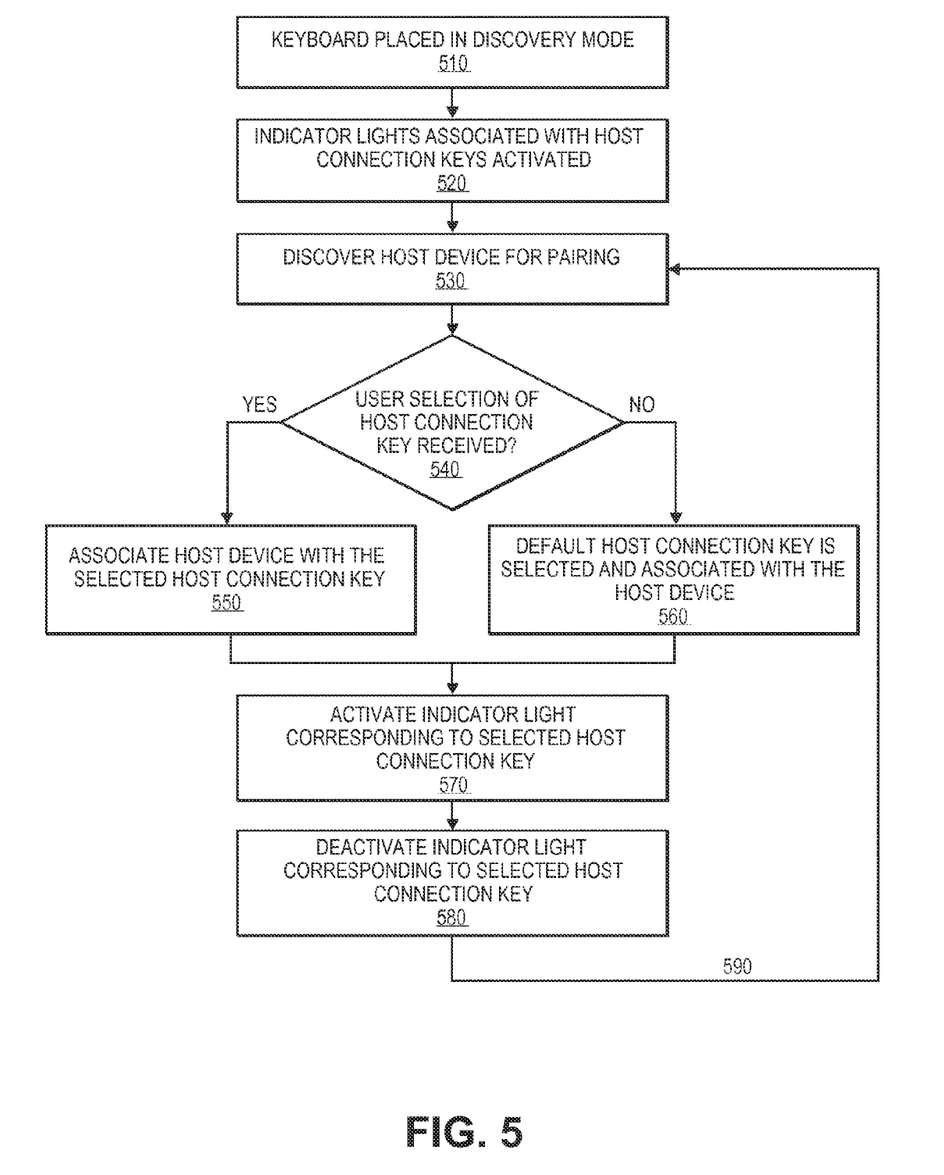
FIG. 5 is a flow diagram for establishing a pairing and connection between a computer keyboard device and a host device.

FIG. 5 is a flow diagram for establishing a pairing and connection between a computer keyboard device 300 and a host device. In most embodiments, the user will place the computer keyboard device 300 near a host device to which input data will be sent.

In step 510, the computer keyboard device 300 is placed in discovery mode. In some embodiments, powering on the computer keyboard device 300 places the computer keyboard device 300 automatically in discovery mode. In some embodiments, after the power-up sequence has completed and the computer keyboard device 300 is already in use, the user may press the "CONNECT" button 420 to advertise the availability of the computer keyboard device 300 to provide input data to host devices. In an alternative embodiment, instead of pressing the "CONNECT" button 420, the user may perform a long key press on a selected host connection key to start the discovery process. In this embodiment, a discovered host will be represented by the selected host connection key. In some embodiments, a long key press of the "CONNECT" button 420 may be considered holding the key down for a period longer than two seconds.

In step 520, the indicator lights associated with the host connection keys 340 are activated. In some embodiments, the indicator lights associated with the host connection keys 340 blink to provide an indication to the user that they may select one of the host connection keys 340 to represent a pairing with a host device. In some embodiments, where discovery mode was initiated by a long key press of one of the host connection keys 340, only the light indicator associated with the selected host connection key 340 may blink. In such embodiments, the light indicators associated with the unselected host connection keys 340 may be off or solid.

In step 530, the host device discovers the computer keyboard device 300 for pairing. In some embodiments, the user may have to interact with the host device to initiate a connection with the computer keyboard device 300. For example, the user may have to input a code into the host device to confirm that the user wants to pair the computer keyboard device 300 with the host device. The user may be required to access settings in the host device and select the computer keyboard device 300 from a list of broadcasting devices. In other embodiments, the user does not have to interact with the host device to initiate the connection with the computer keyboard device 300.

In step 540, the computer keyboard device 300 determines whether the user has selected one of the host connection keys 340 with which to associate the current host device pairing. The computer keyboard device 300 identifies the host connection key 340 that was selected by the user. If the computer keyboard device 300 determines that the user has selected one of the host connection keys 340, then in step 550, the selected host connection key 340 is associated with the host device. In some embodiments, the light for the associated host connection key 340 blinks rapidly to indicate that a connection is being established with the host device.

In step 560, if the user has not selected one of the host connection keys 340 within a certain amount of time, a default host connection key 340 may be selected and associated with the host device. The computer keyboard device 300 may be configured to sequence the set of host connection keys 340 in a predefined order, and the next available host connection key 340 in the sequence may be selected as the default host connection key 340. In some embodiments, in order to be eligible for selection as the default host connection key 340, the host connection key 340 may not currently be paired or associated with any other host device. In some embodiments, if all host connection keys 340 are paired or associated with host devices, the host connection key 340 representing the current connection will be selected as the default host connection key 340, and the current connection will be broken (e.g. the host device currently paired with the computer keyboard device 300 will be unpaired). In an alternative embodiment, if all host connection keys 340 currently represent a host device, the host device will be paired with a designated host connection key 340, regardless of whether the designated host connection key 340 is currently paired with another host device. In some embodiments, if the user does not select a host connection key 340 and all of the host connection keys 340 are currently in use (e.g. all are paired with host devices), the computer keyboard device 300 will not select a default host connection key 340, and no connection may be established with the newly discovered host device. In such embodiments, a new connection with the newly discovered host device will not be made unless the user specifically selects a host connection key 340.

In some embodiments, when the host device is associated with the host connection key 340, the pairing information can be stored in a non-volatile memory component 270. In such embodiments, after the computer keyboard device 300 is powered down and subsequently powered back up, the host pairing information is accessed from the memory component 270 and used until the host connection key 340 is selected to represent a different host device. If the user-selected host connection key 340 was previously associated with a different host device, the connection to the previous host device may be dropped and the user-selected host connection key 340 associated with the newly discovered host device.

In step 570, once the connection is successfully established with the host device, the indicator light associated with the selected host connection key 340 is activated. In some embodiments, the indicator light for the selected host connection key 340 stops blinking and remains solid for a predefined period of time to provide an indication to the user that the connection between the host device and the computer keyboard device 300 was successfully established.

In step 580, once the predefined period of time lapses, the indicator light for the host connection key 340 is deactivated.

In some embodiments, if the host device is not discovered within a certain amount of time, the discovery process may be aborted. For example, the computer keyboard device 300 may remain discoverable for 15 minutes when the power is first turned on, but only for 3 minutes after pressing the "CONNECT" button 420. Once the discovery process has ended, the indicator lights associated with each host connection key may be deactivated.

In step 590, the process of establishing wireless connections may be repeated for other host devices. Thus, there may be multiple host devices associated with the computer keyboard device 300 simultaneously, but at any given moment, the computer keyboard device 300 has a connection to only one of the associated host devices and will send input data to only the associated host device.

According to some embodiments, to switch from sending data from the computer keyboard device 300 to one paired host device to a second paired host device, the user may select the host connection key 340 associated with the second paired host device. In some embodiments, re-directing input data to a host device that is already paired may be indicated by a short key press of the corresponding host connection key 340. For example, a short key press may be detected as depressing the host connection key 340 for an amount of time less than two seconds. In other embodiments, a short key press may be indicated by a key press shorter than or longer than two seconds. The corresponding indicator light blinks to indicate that the computer keyboard device 300 is (re)connecting to another host device. When the reconnection process is completed, the indicator light is activated without blinking for a few seconds to indicate that the connection was established successfully. If there is no host device associated with the selected host connection key 340, the indicator light may blink.

In some embodiments, the computer keyboard device 300 may be configured with a set of rules for determining what state the keyboard should return to upon a failure to connect to a host device. For example, when a host connection key 340 is pressed to switch between host devices for sending input data, the connection to the last host device previously receiving input data may reestablished.

Figure 6:
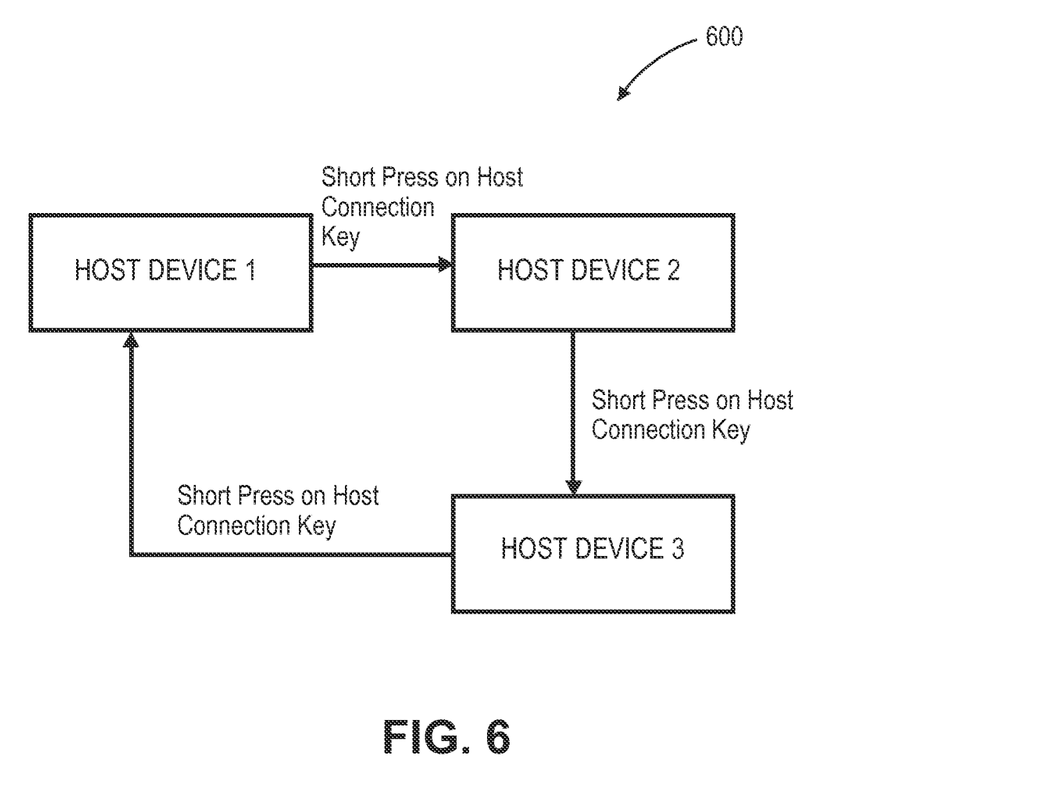
FIG. 6 is a diagram illustrating cycling through host devices in a memory component according to an embodiment of the present invention.

In alternative embodiments, the computer keyboard device, or other input devices (e.g., a mouse or touchpad), may have a single host connection key that is capable of being used to manage multiple connections with multiple host devices. In such embodiments, the single host connection key may be used in conjunction with the display to establish and manage connections with multiple host devices. For example, a long press of the single host connection key may place the computer keyboard device into discovery mode and ready to be paired with a new host device. A short press of the single host connection key may allow the user to access a listing of the host devices currently paired with the computer keyboard device. The user may then be able to cycle through the host devices stored in memory through additional short presses of the single host connection key. FIG. 6 is a diagram 600 illustrating cycling through host devices in a memory component according to an embodiment of the present invention. The stored connections may be a circular memory buffer allowing the user to cycle through all stored connections from the first stored connection through the last stored connection, and then cycle back to the first store connection. Once the user has cycled to the host device that the user wants to re-connect with, the user may conduct a long press of the single host connection key, and the connection process will be conducted.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teaching provided herein, a person of ordinary skill in the art will appreciate other ways and/or methods to implement the present invention.

In embodiments, any of the entities described herein may be embodied by a computer that performs any or all of the functions and steps disclosed.

It should be noted that any recitation of "an", "an" or "the" is intended to mean "one or more" unless specifically indicated to the contrary.

It is also understood that the examples and embodiments described herein are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. A data input device comprising:
   a housing;
   a communications module, coupled to the housing, operable to discover a plurality of computing devices capable of establishing a connection over a wireless connection, and further operable to maintain one or more established connections with one or more of the plurality of computing devices;
   a plurality of input members disposed on the housing, the plurality of input members including a plurality of host connection keys configured to cause the communications module to discover the plurality of computing devices accessible over the wireless connection; and
   a light-emitting member associated with each host connection key of the plurality of host connection keys.

2. The data input device of claim 1 further comprising:
   a light controller coupled to each light-emitting member associated with each host connection key operable to control the activation of each light-emitting member associated with each host connection key.

3. The data input device of claim 2 wherein each light-emitting member associated with each host connection key indicates a connection status for each host connection key.

4. The data input device of claim 3 wherein the data input device provides sensory feedback by one or more of haptic feedback, auditory feedback, and visual feedback to indicate the connection status for each host connection key.

5. The data input device of claim 4 wherein the visual feedback is provided on an active or passive display embedded on the data input device.

6. The data input device of claim 5 wherein the display indicates the computing device of the plurality of computing devices connected to the data input device.

7. The data input device of claim 1 wherein a first host connection key is associated with a first connection to the first computing device and a second host connection key is associated with a second connection to a second computing device.

8. The data input device of claim 1 wherein the data input device is one of a keyboard, a mouse, or a touchpad device.

9. The data input device of claim 1 wherein the communications module is configured to operate via Bluetooth communications protocols.

* * * * *